United States Patent
Chen

Patent Number: 5,927,859
Date of Patent: Jul. 27, 1999

[54] SLEEVE BEARING STRUCTURE

[75] Inventor: Lee-Long Chen, Taipei, Taiwan

[73] Assignee: Delta Electronics, Inc., Taipei, Taiwan

[21] Appl. No.: 08/876,879

[22] Filed: Jun. 16, 1997

[51] Int. Cl.$^6$ .................................................. F16C 32/06
[52] U.S. Cl. ............................................ 384/114; 384/118
[58] Field of Search .................................. 384/114, 118, 384/226, 241, 279, 286, 291, 292, 397, 415

[56] References Cited

U.S. PATENT DOCUMENTS

| | | | |
|---|---|---|---|
| 2,571,868 | 10/1951 | Haller | 384/292 X |
| 3,494,674 | 2/1970 | Muijderman et al. | 384/113 |
| 4,805,972 | 2/1989 | Tanaka et al. | 384/113 X |
| 4,934,836 | 6/1990 | Tanaka et al. | 384/113 X |
| 5,018,881 | 5/1991 | Asada | 384/100 X |
| 5,112,141 | 5/1992 | Asada et al. | 384/100 |
| 5,277,499 | 1/1994 | Kameyama | 384/112 X |
| 5,281,035 | 1/1994 | Lo | 384/286 X |
| 5,559,382 | 9/1996 | Oku et al. | 384/112 X |

*Primary Examiner*—Thomas R. Hannon
*Attorney, Agent, or Firm*—Christie, Parker & Hale, LLP

[57] ABSTRACT

A sleeve bearing structure for holding a shaft rotating in a first direction includes a bearing having an inward wall defining therein a through hole, a bearing stand engaged with the bearing for supporting the bearing and having a cavity which is in communication with the through hole at the bottom thereof below the bearing, and a first set of threads formed in the first direction on a first part of the inward wall.

13 Claims, 3 Drawing Sheets

SLEEVE BEARING STRUCTURE

FIELD OF THE INVENTION

The present invention is related to a bearing structure, and more particularly to a powder-sintered sleeve bearing structure.

BACKGROUND OF THE INVENTION

A bearing is a usual component of machinery. It is used for holding rotating or slipping parts and keeping them moving in the right position. Ball bearings used worldwide are too expensive to be applied to low cost products. Hence, the cheaper powder-sintered sleeve bearings play an important role in recent machine manufacturing. The conventional sleeve structure is shown in FIG. 1(a). A rotating shaft 1 is plunged into a through hole 12 of the bearing 13. A bearing stand 14 is engaged with the powder-sintered bearing 13 and a cavity 15 is formed at the bottom of the bearing stand 14. The cavity 15 is in communication with the through hole 12 and full of lubricant used for reducing friction forces between the rotating shaft 11 and the inward wall 16 of the bearing 13 due to high-speed rotation of the rotating shaft 11. High-speed rotation, however, causes the lubricant to flow out via the gap between the rotating shaft 11 and the inward wall 16. The heat generated by the high-speed rotation also causes evaporation of the lubricant. Reduction of the lubricant will make the rotating shaft 11 contact with the inward wall 16 of the bearing 13 directly as shown in FIG. 1(b). Greater friction forces thus incurred on the top part 17 and the foot part 18 of the bearing 13 will shorten the bearing life. The present invention is developed for the purpose of decreasing the leakage of the lubricant and avoiding direct contact between the rotating shaft and the bearing.

SUMMARY OF THE INVENTION

The present invention is related to a sleeve bearing structure for holding a shaft rotating in a first direction. The sleeve bearing structure includes a bearing having an inward wall defining therein a through hole, a bearing stand engaged with the bearing for supporting the bearing and having a cavity at the bottom thereof below the bearing, and a first set of threads formed in the first direction on a first region of the inward wall. The cavity is in communication with the through hole.

In accordance with another aspect of the present invention, the structure further includes a second set of threads formed in a second direction opposite to the first direction on a second region of the inward wall under the first region. The second region is shorter than the first region.

In accordance with another aspect of the present invention, the structure preferably includes a third region without threads located between the first region and the second region.

In accordance with another aspect of the present invention, the first direction is clockwise and the second direction is counterclockwise.

Certainly, it may also be so designed that the first direction is counterclockwise and the second direction is clockwise.

In accordance with another aspect of the present invention, the cavity is used for containing therein a lubricant, e.g., grease.

In accordance with another aspect of the present invention, the bearing is a powder-sintered bearing.

In accordance with another aspect of the present invention, the structure further includes a plurality of slots formed into the bearing paralleling the through hole and communicating with the cavity. The slots are shorter than the bearing.

The present invention may best be understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purpose of illustration and description only; it is not intended to be exhaustive or to be limited to the precise form disclosed.

Figure 1A:
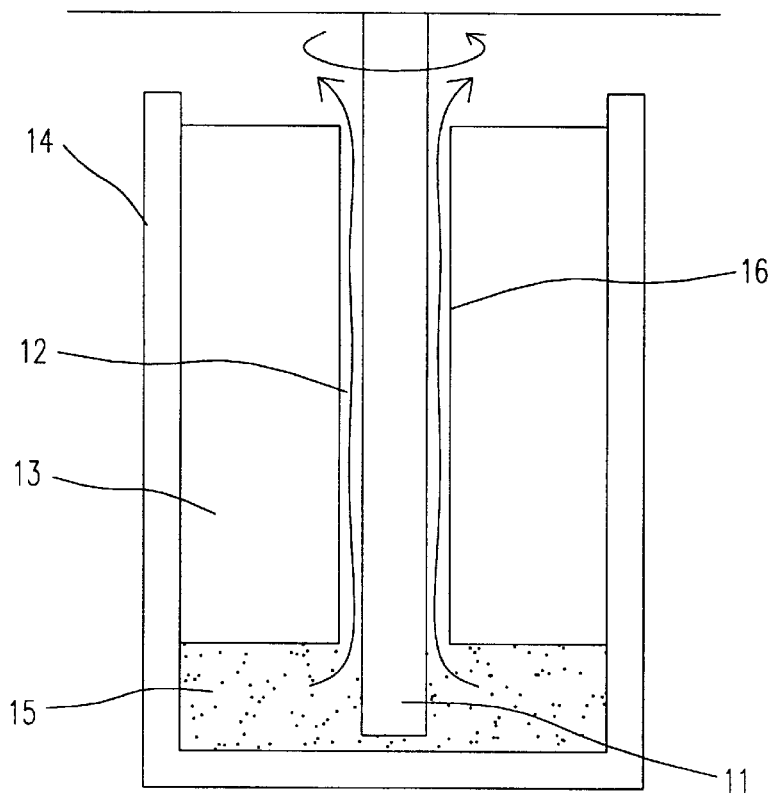
FIGS. 1(a)–(b) are schematic diagrams showing the structure and the defect of a sleeve bearing according to the prior art.
Figure 1B:
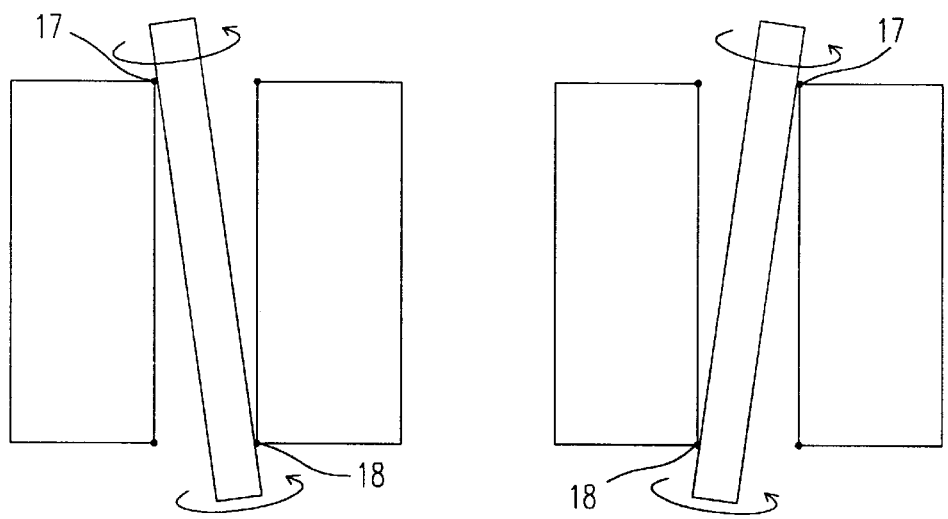
Figure 2:
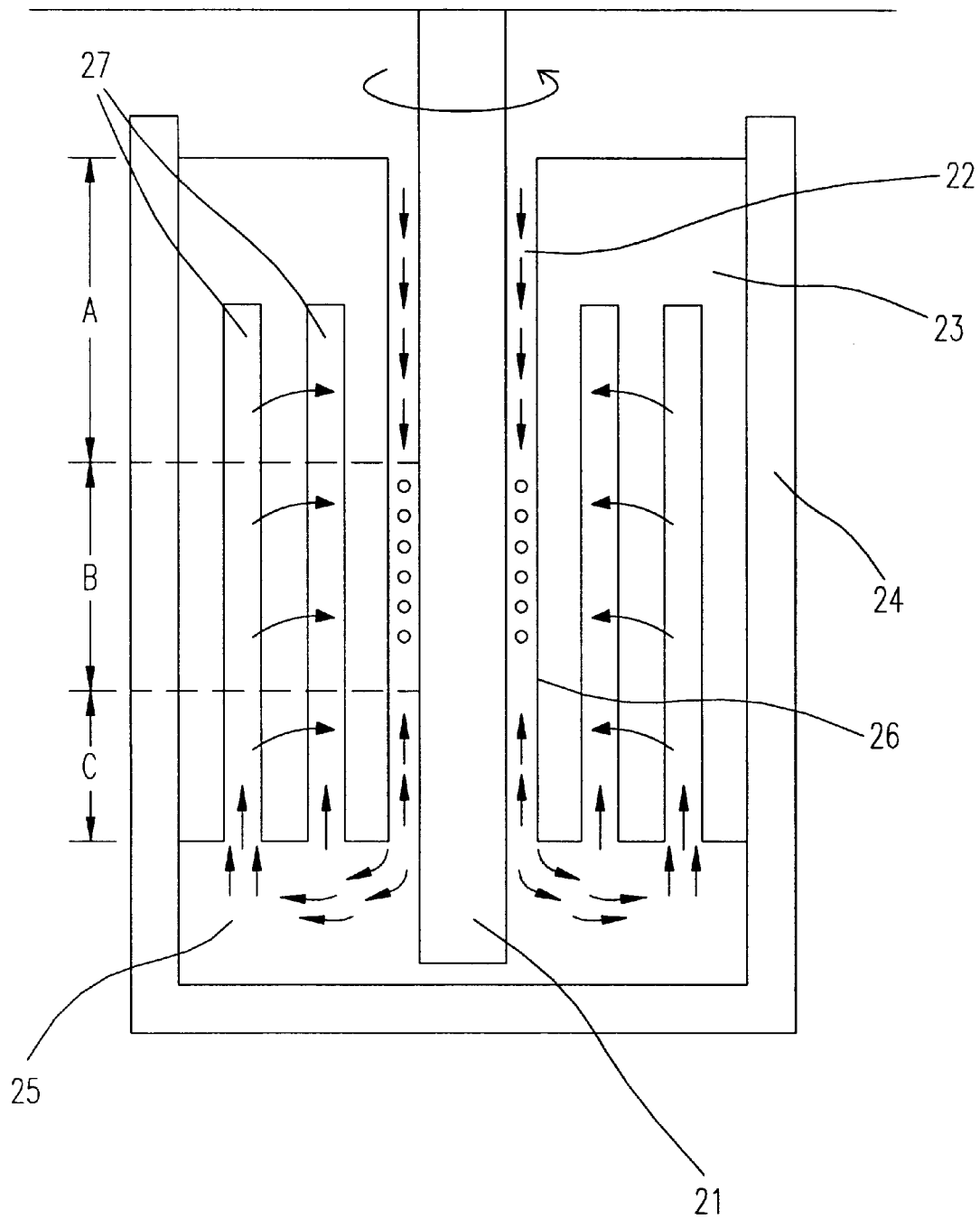
FIG. 2 is a schematic diagram showing a preferred embodiment of a sleeve bearing according to the present invention.
Figure 3:
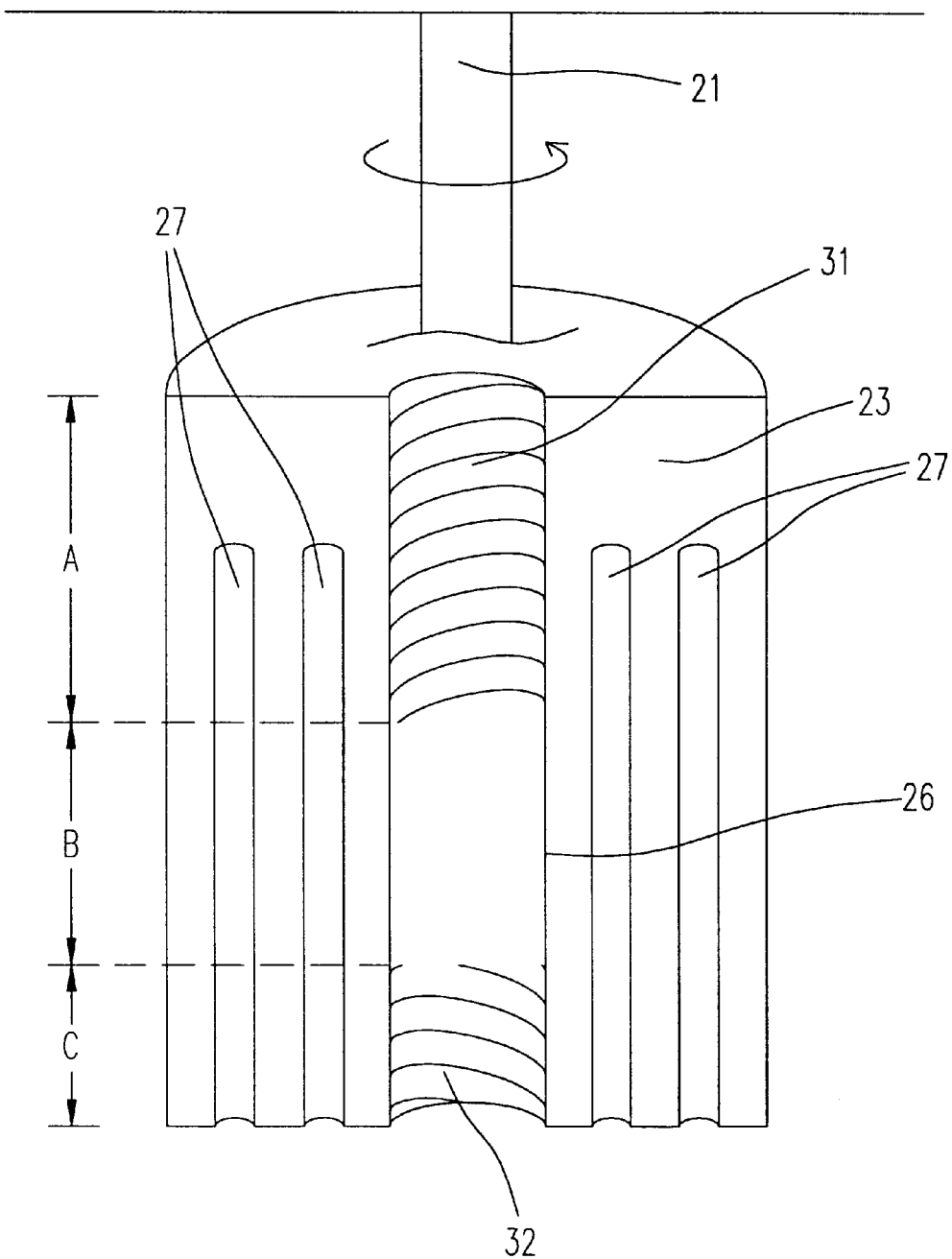
FIG. 3 is a schematic diagram showing an inward wall structure of a sleeve bearing according to the present invention.

Please refer to FIG. 2, which is a schematic diagram showing a preferred embodiment of a sleeve bearing according to the present invention. A rotating shaft 21 is plunged into a through hole 22 of the bearing 23. A bearing stand 24 is engaged with the powder-sintered bearing 23 and a cavity 25 is formed at the bottom of the bearing stand 24. The cavity 25 is in communication with the through hole 22 and full of grease used for reducing the friction between the rotating shaft 21 and the inward wall 26 of the bearing 23 when rotating shaft 21 rotates with a high speed. A plurality of slots 27 are formed parallel to the through hole 22 and communicating with the cavity 25. For solving the trouble of losing grease, threads are introduced into this structure. The inward wall 26 is divided into three regions: the first region A, the second region C, and the third region B. If the shaft 21 rotates counterclockwise, a set of counterclockwise threads 31 are formed on the first region A and a set of clockwise threads 32 are formed on the second region C. There are no threads on the third region B. Similarly, if the shaft 21 rotates in clockwise, a set of clockwise threads 31 are formed on the first region A and a set of counterclockwise threads 32 are formed on the second region C. The relation between the direction and the location of threads is shown in FIG. 3. The grease moves along the threads and exerts a downward force in the first region A while the grease exerts an upward force in the second region C. As stated above, the pressure of grease increases in the third region B because of the two opposite forces, and it prevents the shaft 21 from contacting directly the inward wall 26 of the bearing 23 and from being damaged as it would be in the prior art. Because the second region C is shorter than the first region A, the downward force exerted on the grease is greater than the upward one and pushes the grease downwardly into the cavity 25. The pressure of grease in the cavity 25 increases and forces grease to flow up through the slots 27. Then grease interpenetrates into the bearing 23, exudes into the through hole 22, and flows back to the cavity 25 to form a flowing cycle 25 as shown by the arrowheads in FIG. 2. The slots 27 are shorter than the bearing 23 so that grease can not flow out. The present invention can control temperature well and decreases loss of grease. It also properly improves the usual disadvantage such as serious friction inherent in the conventional structure.

The sleeve bearing structure mentioned in the present invention improves the problem of grease leakage and the friction between bearing and shaft. Also, it is less expensive than ball bearings. It can be applied to many cases such as motors, gear bearings, watch bearings, and car bearings, and is really a highly practical invention.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sleeve bearing structure for holding a shaft rotating in a clockwise or counterclockwise rotary direction and for decreasing loss of lubricant contained in said sleeve bearing structure comprising:

a bearing having an inward wall defining therein a through hole;

a bearing stand engaged with said bearing for supporting said bearing, and having a cavity at one end thereof adjacent said bearing, said cavity being in communication with said through hole; and at least one first thread surrounding the periphery of the shaft a plurality of times formed in a helix shape extending longitudinally along the shaft towards the cavity in the rotary direction of the shaft on a first region of said inward wall.

2. A structure according to claim 1, further comprising a plurality of slots formed into said bearing to parallel said through hole and to communicate with said cavity, said slots being shorter than said bearing.

3. A structure according to claim 1 wherein said bearing is a powder-sintered bearing.

4. A structure according to claim 1 wherein said cavity is used for containing therein said lubricant.

5. A structure according to claim 4 wherein said lubricant is grease.

6. A structure according to claim 1 wherein said at least one first thread directs said fluid along the shaft towards said cavity.

7. A structure according to claim 1, further comprising at least one second thread surrounding the periphery of the shaft a plurality of times formed in a helix shape extending longitudinally along the shaft away from the cavity in the rotary direction of the shaft on a second region of said inward wall under said first region.

8. A structure according to claim 7, wherein said second region is shorter than said first region.

9. A structure according to claim 8 wherein said at least one first thread directs said fluid towards said cavity and said at least one second thread directs said fluid away from said cavity towards said at least one first thread.

10. A structure according to claim 7, further comprising a third region having no threads and being located between said first region and said second region.

11. A structure according to claim 7, wherein said rotary direction of the shaft is clockwise.

12. A structure according to claim 7, wherein said rotary direction of the shaft is counterclockwise.

13. A structure according to claim 7 wherein said at least one first thread directs said fluid towards said cavity and said at least one second thread directs said fluid away from said cavity towards said at least one first thread.

* * * * *